United States Patent
Kundu et al.

(10) Patent No.: US 10,967,972 B2
(45) Date of Patent: Apr. 6, 2021

(54) VEHICULAR ALERT SYSTEM

(71) Applicant: INTERNATIONAL BUSINESS MACHINES CORPORATION, Armonk, NY (US)

(72) Inventors: Ashish Kundu, Elmsford, NY (US); Clifford A. Pickover, Yorktown Heights, NY (US); James R. Kozloski, New Fairfield, CT (US); Justin D. Weisz, Stamford, CT (US); Michael Gordon, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/805,569

(22) Filed: Feb. 28, 2020

(65) Prior Publication Data
US 2020/0198783 A1    Jun. 25, 2020

Related U.S. Application Data

(63) Continuation of application No. 15/613,351, filed on Jun. 5, 2017, now Pat. No. 10,654,570.

(51) Int. Cl.
*B64C 39/02* (2006.01)
*G08G 1/16* (2006.01)
(Continued)

(52) U.S. Cl.
CPC .............. *B64C 39/024* (2013.01); *B60Q 9/00* (2013.01); *B60W 40/04* (2013.01); *B60W 40/06* (2013.01);
(Continued)

(58) Field of Classification Search
CPC ............ B64C 39/024; B64C 2201/021; B64C 2201/141; B60Q 9/00; B60W 40/04;
(Continued)

(56) References Cited

U.S. PATENT DOCUMENTS 5,061,932 A    10/1991    Tribe et al.
6,778,074 B1    8/2004    Cuozzo
(Continued)

OTHER PUBLICATIONS

U.S. Appl. No. 15/613,351, filed Jun. 5, 2017, U.S. Pat. No. 10,654,570.
(Continued)

*Primary Examiner* — Hussein Elchanti
(74) *Attorney, Agent, or Firm* — F. Chau & Associates, LLC (57) ABSTRACT

A vehicular alert system includes an autonomous aerial vehicle and a central computer. The autonomous aerial vehicle includes a processor, a display, and a detector. The processor controls a data transceiver. The detector detects one or more vehicular condition. The central computer communicates with the autonomous aerial vehicle via the data transceiver. The central computer includes a memory device. The memory device stores vehicular condition data and road condition data. The central computer communicates one of a vehicular condition or a road condition to the autonomous aerial vehicle. The processor of the autonomous aerial vehicle displays the received condition on the display.

13 Claims, 4 Drawing Sheets

(51) Int. Cl.
  *B60W 40/06* (2012.01)
  *B60W 40/04* (2006.01)
  *G08G 1/0967* (2006.01)
  *B60Q 9/00* (2006.01)
  *G08G 1/017* (2006.01)
  *G08G 1/0955* (2006.01)
  *G08G 1/052* (2006.01)

(52) U.S. Cl.
  CPC ............. *G08G 1/017* (2013.01); *G08G 1/052* (2013.01); *G08G 1/0955* (2013.01); *G08G 1/096716* (2013.01); *G08G 1/096741* (2013.01); *G08G 1/096775* (2013.01); *G08G 1/096791* (2013.01); *G08G 1/164* (2013.01); *B64C 2201/021* (2013.01); *B64C 2201/141* (2013.01)

(58) Field of Classification Search
  CPC ....... B60W 40/06; G08G 1/017; G08G 1/052; G08G 1/0955; G08G 1/096716; G08G 1/096741; G08G 1/096775; G08G 1/096791; G08G 1/164
  See application file for complete search history.

(56) References Cited

U.S. PATENT DOCUMENTS

| | | | |
|---|---|---|---|
| 8,417,442 B2 | 4/2013 | Johnson et al. | |
| 8,880,237 B2 | 11/2014 | Boss et al. | |
| 8,963,702 B2* | 2/2015 | Follmer | G01C 21/3697 340/439 |
| 9,051,043 B1* | 6/2015 | Peeters | B64C 19/00 |
| 9,505,494 B1 | 11/2016 | Marlow et al. | |
| 9,866,313 B1* | 1/2018 | Murphy | H04W 16/26 |
| 9,944,392 B2* | 4/2018 | Abuelsaad | B60R 21/00 |
| 2008/0129541 A1 | 6/2008 | Lu et al. | |
| 2008/0169970 A1 | 7/2008 | Woodcox et al. | |
| 2012/0215416 A1 | 8/2012 | Poulin | |
| 2013/0049994 A1 | 2/2013 | Nicholson | |
| 2013/0222175 A1 | 8/2013 | Smith et al. | |
| 2014/0244150 A1 | 8/2014 | Boesch et al. | |
| 2014/0336848 A1 | 11/2014 | Saund et al. | |
| 2015/0015457 A1 | 1/2015 | Takasu et al. | |
| 2015/0054658 A1* | 2/2015 | Kosatka-Pioro | G08G 1/096783 340/905 |
| 2015/0262482 A1 | 9/2015 | Kosatka-Pioro et al. | |
| 2015/0324798 A1 | 11/2015 | Kai et al. | |
| 2015/0353206 A1 | 12/2015 | Wang | |
| 2016/0016663 A1* | 1/2016 | Stanek | B60W 30/00 701/3 |
| 2016/0059962 A1* | 3/2016 | Abuelsaad | G05D 1/106 701/3 |
| 2016/0096430 A1 | 4/2016 | Park et al. | |
| 2016/0236638 A1 | 8/2016 | Lavie et al. | |
| 2016/0272317 A1 | 9/2016 | Cho et al. | |
| 2016/0379492 A1* | 12/2016 | Roy | G08G 1/0129 340/907 |
| 2017/0046785 A1* | 2/2017 | Herrington | G06Q 40/08 |
| 2017/0069214 A1* | 3/2017 | Dupray | G08G 5/0013 |
| 2017/0086048 A1 | 3/2017 | Cho | |
| 2017/0144599 A1 | 5/2017 | Lee et al. | |
| 2017/0161569 A1* | 6/2017 | Ren | G08G 1/16 |
| 2017/0210451 A1 | 7/2017 | Oh | |
| 2017/0234696 A1 | 8/2017 | Boesch et al. | |
| 2018/0029522 A1 | 2/2018 | Gordon et al. | |
| 2018/0029706 A1 | 2/2018 | Baruch | |
| 2018/0061230 A1 | 3/2018 | Madigan et al. | |
| 2018/0061232 A1 | 3/2018 | Madigan et al. | |
| 2018/0107204 A1 | 4/2018 | Mikan et al. | |

OTHER PUBLICATIONS

Radarsign, "Why do Radar Speed Signs Work?", www.radarsign.com, 2017, 5 pages.
"Radar Speed Sign", https://en.wikipedia.org/wiki/Radar_speed_sign, 5 pages, accessed from the Internet, May 2017.
Radarsign, "How Effective are Radar Speed Signs?", www.radarsign.com, 2017, 5 pages.
"Drone Aviary", http://superflux.in/index.php/work/drones, 2015, 7 pages.

* cited by examiner

VEHICULAR ALERT SYSTEM

CROSS-REFERENCE TO RELATED APPLICATION

This application claims priority under 35 U.S.C. § 120 to U.S. patent application Ser. No. 15/613,351, filed on Jun. 5, 2017, the disclosure of which is incorporated by reference herein in its entirety.

TECHNICAL FIELD

The present invention relates to vehicular alert system and, more particularly to a method, system, and computer program product for automatically deploying a vehicular alert system at a determined region of need.

DISCUSSION OF RELATED ART

Radar speed signs are interactive signs, generally including a plurality of LEDs, which display a speed of an approaching vehicle. Radar speed signs may cause a reduction of the speed of passing vehicles by making drivers aware that they are driving above the speed limit and at unsafe speeds. Radar speed signs may also be used to reduce traffic in addition to or instead of physical devices such as speed bumps, speed cushions, speed tables, and speed humps.

Stationary radar speed signs are only temporarily visible to passing motorists and the information conveyed may be easily forgotten. Furthermore, radar speed signs may provide inaccurate speed readings when multiple vehicles approach the radar speed sign as it might not be clear for which vehicle the radar speed sign refers to. Accordingly, a driver in vehicle approaching the radar speed sign amongst other vehicles may infer that the radar speed sign is not referencing the driver's vehicle speed or that the driver is driving at an acceptable speed as others are driving at similar speeds.

SUMMARY

Exemplary embodiments of the present invention provide a vehicular alert system. The vehicular alert system includes an autonomous aerial vehicle and a central computer. The autonomous aerial vehicle includes a processor, a display, and a detector. The processor controls a data transceiver. The detector detects one or more vehicular condition. The central computer communicates with the autonomous aerial vehicle via the data transceiver. The central computer includes a memory device. The memory device stores vehicular condition data and road condition data. The central computer communicates one of a vehicular condition or a road condition to the autonomous aerial vehicle. The processor of the autonomous aerial vehicle displays the received condition on the display.

Exemplary embodiments of the present invention provide a computer readable storage medium having stored codes executable by a computer to implement a vehicular alert method. The method includes receiving detected data including vehicular condition data and road condition data transmitted by at least one of a plurality of autonomous aerial vehicles. The detected data is compared with present hazardous parameters. Upon determining a match, at least one of the plurality of autonomous aerial vehicles is caused to display a hazard signal and a reduce speed signal on a display.

Exemplary embodiments of the present invention provide a vehicular alert method. The method includes detecting at least one of a plurality of autonomous aerial vehicles at least one of location, vehicular condition, one or more vehicular condition including vehicle speed, and one or more predefined road hazard condition. A central computer is loaded with road location and speed limit data via a wired or wireless network. The detected data is received at the central computer. The detected data includes vehicular condition data and road condition data transmitted by at least one of the plurality of autonomous aerial vehicles. Upon the central computer determining an existence of a hazardous condition, one or more of the plurality of autonomous aerial vehicles is dispatched to the location determined to be hazardous.

BRIEF DESCRIPTION OF THE DRAWINGS

These and/or other aspects will become more apparent and more readily appreciated from the following description of the exemplary embodiments of the present invention, taken in conjunction with the accompanying drawings, in which.

DETAILED DESCRIPTION

The descriptions of the various exemplary embodiments of the present invention have been presented for purposes of illustration, but are not intended to be exhaustive or limited to the exemplary embodiments disclosed herein. Several modifications and variations will be apparent to those of ordinary skill in the art without departing from the scope and spirit of the exemplary embodiments of the present invention described herein.

Exemplary embodiments of the present invention will be described more fully hereinafter with reference to the accompanying drawings. Like reference numerals may refer to like elements throughout the specification and drawings.

Figure 1:
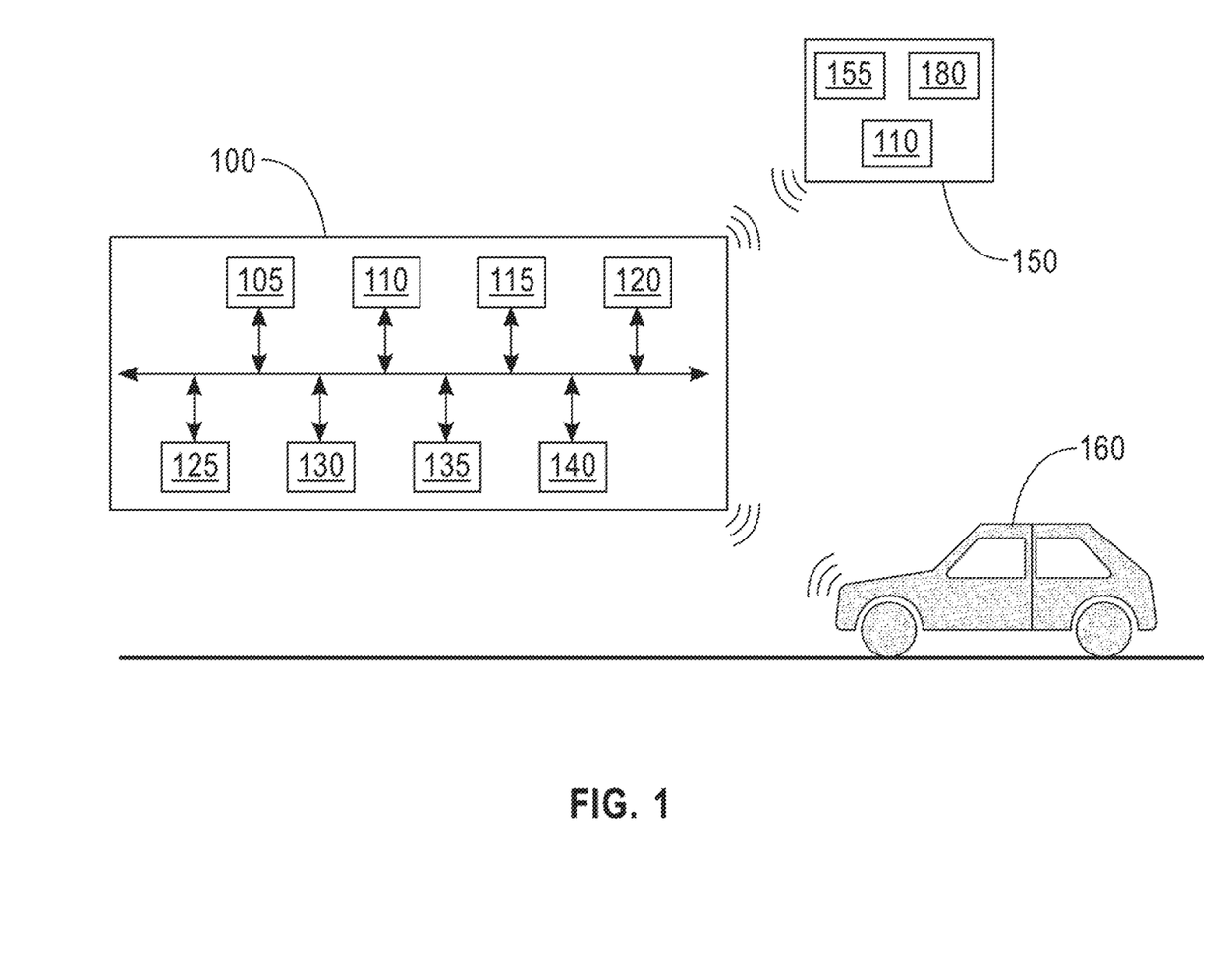
FIG. 1 illustrates a vehicular alert system according to an embodiment of the present invention.

FIG. 1 illustrates a vehicular alert system according to an embodiment of the present invention.

Referring to FIG. 1, the vehicular alert system may include a vehicular alert system vehicle 100. The vehicular alert system vehicle 100 may be an autonomous aerial vehicle, e.g., a drone or a "drone-like" vehicle. The terms vehicular alert system vehicle and autonomous aerial vehicle may be used interchangeably herein. The vehicular alert system vehicle 100 may be battery powered or solar powered, e.g., having an on-board solar chargeable battery. The battery power is used to operate onboard electronics and the various motors to fly the autonomous aerial vehicle. The vehicular alert system vehicle 100 may be utilized for alerting various vehicles, e.g., boats, in addition to motor vehicles.

The vehicular alert system vehicle 100 may include a processor 105. The vehicular alert system vehicle 100 may further include a data transceiver 110, a display 115, and a detector 120. The processor 105 may be configured to control each of the data transceiver 110, the display 115, and the detector 120. The detector 120 may be configured to detect one or more vehicular conditions. The data transceiver 110 of the vehicular alert system vehicle 100 may transmit vehicular or road condition data to one or more vehicles 160, for example, by issuing a visual warning on the display 115 which may move with the vehicular alert system vehicle 100. The road condition data may include one of current traffic, weather, weather forecast, road conditions, history of accidents, history of a driver, or proximity to hazards. Road conditions may include hazards such as animal debris, potholes, or black ice. The location of the hazards may be sent to authorities or to other vehicles nearby. For example, a global positioning system (GPS) location of one or more road hazards may be tagged, e.g., by location and time. The data may be sent to third parties, such as police, emergency personnel, or tow truck operators. The data may be sent through a cellular phone network, for example a short message service (SMS), i.e., text messaging, or a phone call. For example, the vehicular alert system vehicle 100 may make an automatic phone call to the authorities or to other vehicles nearby. The vehicular condition data may include detected data or statistically analyzed data, e.g., on the driver, on a plurality of drivers, or on driving histories. For example, data may exist on a history of accidents at a particular location, e.g., at a specific exit ramp. The data may be sorted to determine the number and severity of accidents at the particular location. Factors such as time of day, vehicular speed, road conditions and weather may be considered in sorting the data. However, exemplary embodiments of the present invention are not limited thereto.

The vehicular alert system vehicle 100 may determine an optimal speed at which the vehicle 160 should move to arrive at the closest traffic light, e.g., before the closest traffic light changes to a red phase or a "stop" signal, based on at least one of vehicular or road condition data. The speed at which the vehicle should be travelling may depend on one or more parameters of a vehicle in view of environmental conditions outside of the vehicle. The vehicle alert system vehicle 100 may consider turns, dangers, road works, and optimal speed and convey this information to the driver along with determining an optimal speed at which the vehicle 160 should move to arrive at the closest traffic light when it is at a green phase or a "go" signal. The vehicular alert system vehicle 100 may output the optimal speed via the display 115.

The vehicular alert system vehicle 100 may use radar, e.g., a Doppler shifted radar apparatus, for target identification with respect to surveillance of moving vehicles. The vehicular alert system vehicle 100 may output the optimal speed to the display 115. The vehicular alert system vehicle 100 may further post a hazardous condition on the display 115. The display 115 may indicate a variety of hazardous conditions, e.g., speed zones, poor road conditions, potholes, black ice, animal crossings, road debris, animal debris ahead, etc.; however, exemplary embodiments of the present invention are not limited thereto. These hazardous conditions may also be used to determine when and how many of the vehicular alert system vehicles 100 are to be deployed. Additionally, the hazardous conditions may determine a customized message on the display 115 of the vehicular alert system vehicle 100. The vehicular alert system vehicle 100 may also travel ahead at a speed to display the hazardous condition to be viewable by a driver of a vehicle 160 traveling at speed.

The vehicular alert system vehicle 100 may further include a speed detector 125. The speed detector 125, e.g., radar or laser based, to detect vehicular speed of a targeted vehicle. The vehicular alert system vehicle 100 may also include a radar speed gun 130. The display 115 of the vehicular alert system vehicle 100 including the radar speed gun 130 may display any of a driver's speed, an actual speed limit (which may depend on current road conditions), a comparison of the driver's speed and the actual speed limit, and other indicia, such as a smiling face, if the speed of the vehicle 160 is below or at the legal speed limit (i.e., OK), or a frowning face if the speed of the vehicle 160 is above the legal speed limit (i.e., not OK); however, exemplary embodiments of the present invention are not limited thereto. Various real-time hazards may be used to trigger a deployment of the vehicular alert system 100. Real-time hazards may include animal debris, potholes, or black ice. The vehicular alert system vehicle 100 may display a reduced speed limit comparative to a legal speed limit. The vehicular alert system vehicle 100 may also display the legal speed limit in addition to current ambient conditions and the speed of the vehicle 160. Accordingly, the vehicular alert system vehicle 100 may also notify drivers obeying the speed limit and provide positive reinforcement, e.g., by displaying the actual speed limit and other indicia, such as a smiling face if the speed of the vehicle 160 is below or at the legal speed limit.

According to an exemplary embodiment of the present invention, the vehicular alert system vehicle 100 may also include a pothole detection apparatus 135. The pothole detection apparatus 135 may be used to determine the existence and size of one or more potholes. For example, a Doppler sensor may be disposed on the vehicular alert system vehicle 100. The Doppler sensor may include a microwave generator. The microwave generator may be connected to a power supply. The microwave generator may be configured to provide a microwave carrier signal. The microwave carrier signal may be emitted as a relatively narrow beam by a sensor, e.g., a microwave horn-type sensor. The microwave horn-type sensor may include a microwave diode. The microwave diode may receive microwaves reflected from a road surface and the microwave generator. The microwave diode may supply a detected signal to a pre-amplifier. The microwave carrier signal from the Doppler sensor may be directed at a road surface. The carrier signal may provide a carrier frequency. Upon impinging on a bump or pothole, the carrier frequency may produce a return signal. The return signal may carry an amplitude modulation. The amplitude modulation may be representative of a profile of the bump or pothole. The carrier signal may be shifted in frequency by a Doppler effect, for example, in accordance with a relative speed between the horn-type sensor and the ground. The return signal sensed by the Doppler sensor may be amplified in the pre-amplifier. The pothole detection apparatus 135 may also determine the existence and size of one or more potholes by visual means, for example, in which cameras are used to capture road features. Various feature classifiers, such as deep neural nets, and the like may be used to identify potholes and other road hazards. Upon detection of one or more potholes, the pothole detection apparatus 135 may forward the detected information to the processor 105. Thus, a pothole warning on the display 115 to warn drivers before they strike the pothole. Since swerving to avoid potholes may cause an accident, by alerting a driver before arriving at the potholes, the number of potential accidents may be decreased or avoided. Furthermore, the processor 105 of the vehicular alert system vehicle 100 may notify road crews of the locations of the potholes for maintenance.

According to an exemplary embodiment of the present invention, the vehicular alert system vehicle 100 may further include detection sensors 140. The detection sensors 140 may be configured to detect hazards. For example, the detection sensors 140 may include a black ice detection system and an imaging sensor. The imaging sensor may have a forward field of view in the direction the vehicular alert system vehicle 100 is traveling, e.g., in a forward direction. The control operable may be configured to process images captured by the imaging sensor. The control operable may also be configured to detect black ice on a road surface located in front of the vehicular alert system vehicle 100 in response to the image processing. The black ice detection system may trigger the deployment of the vehicular alert system vehicle 100. Furthermore, the vehicular alert system vehicle 100 may change the displayed speed on the display 115 in response to the detection of black ice. For example, the vehicular alert system vehicle 100 deployed by the black ice detection system may display a reduced speed limit comparative to the legal speed limit. The vehicular alert system vehicle 100 may also display a warning about the presence of black ice. The vehicular alert system vehicle 100 may compare the reduced speed limit to the driver's current speed.

According to an exemplary embodiment of the present invention, the vehicular alert system vehicle 100 may communicate with the vehicle 160. The vehicular alert system vehicle 100 may communicate with the vehicle 160 using radio and related technology. For example, the vehicular alert system vehicle 100 may broadcast information to a radio receiver of the vehicle 160. The information may be used to implement an alert or message of a radio system of the vehicle 160. Furthermore, the vehicular alert system vehicle 100 may be configured to provide the legal speed limit and the speed of the vehicle to be displayed on a monitor in the vehicle 160. The vehicle 160 and/or the vehicular alert system vehicle 100 may produce an audible warning of excessive speed. The audible warning may reduce the amount of time the driver needs to spend examining the speedometer of the vehicle 160 and/or the display 115 of the vehicular alert system vehicle 100. The vehicular alert system vehicle 100 may also send a signal, e.g., "SLOW DOWN", to display on the monitor of the vehicle 160.

According to an exemplary embodiment of the present invention, the vehicular alert system vehicle 100 may include information about a driver of the vehicle. The vehicular alert system vehicle 100 may change its display 115 accordingly. For example, information relating to reaction time of the driver may be useful for student drivers or elderly drivers who may have limited experience or cognitive difficulties. Additionally, these drivers may benefit from speed restrictions not passed on to other drivers.

According to an exemplary embodiment of the present invention, the vehicular alert system vehicle 100 may fly alongside or ahead of the vehicle 160. Accordingly the vehicular alert system vehicle 100 may obtain the vehicle's speed. The vehicular alert system vehicle 100 may obtain the vehicle's speed via a global positioning system (GPS) located within the vehicle 160. The vehicular alert system vehicle 100 may display the speed of the vehicle 160 in real time. The vehicular alert system vehicle 100 may identify a speeding vehicle. The vehicular alert system vehicle 100 may fly ahead of the speeding vehicle. Therefore, the vehicular alert system vehicle 100 may present a persistent indication of speeding as the driver progresses. The presentation of speeding may persist until the driver slows down. Accordingly, the vehicular alert system vehicle 100 might not be ignored by motorists in comparison to a stationary radar speed sign.

The vehicular speed alert vehicle 100 may capture pictures of offending vehicles. The vehicular speed alert vehicle 100 may further mark speeding vehicles, e.g., with a washable ink on the roof, for tracking or identification purposes. The vehicular speed alert vehicle 100 may also attach itself, e.g., by use of a suction cup, onto the roof, for tracking purposes.

The vehicular alert system may further include a central computer system 150. The central computer system 150 may be disposed in a location remote from the vehicular alert system vehicle 100. The central computer system 150 may be configured to communicate with the vehicular alert system vehicle 100. The central computer system 150 may include a data transceiver 110. The data transceiver 110 may communicate with the vehicular alert system vehicle 100. The central computer system 150 may include a central computer 180 and a memory device 155. The memory device 155 may be configured to store vehicular condition data and road condition data. The central computer system 150 may communicate at least one of a vehicular condition or a road condition to the vehicular alert system vehicle 100. The processor 105 of the vehicular alert system vehicle 100 may display the received condition on the display 115.

The central computer system 150 may perform data analytics on crowd-sourced and road condition data. For example, information on road conditions (e.g., a location of a pothole, severity of traffic, a location of an accident) may be data communicated from vehicles 160 and/or from sensors in vehicular alert system vehicles 100. The information may be analyzed to determine whether a hazard exists. The information may also be analyzed to determine the severity of a hazard in the local area, e.g., the surrounding area of the vehicular alert system vehicle 100. For example, information on road conditions may be analyzed to determine how old the information is and the severity of a hazard (e.g., as determined by a look up table) to determine if the hazard is still present. Accordingly, an accident that occurred a day ago may be determined by the central computer system 150 to no longer be a hazard. Crowd-sourcing may also be used to provide information to the central computer system 150. Crowd-sourcing may be performed in real-time. For example, a vehicle 160 may report a hazard, e.g., a location of a pothole, to a repository or an interface. An aggregate of data received may be used to locate hazards in comparison to current locations of vehicular alert system vehicles 100. Accordingly, the repository or interface may assess whether the hazard is still present and whether the vehicular alert system vehicle 100 is in a surrounding area to assist in alerting drivers of the hazard. For example, crowd-sourcing may indicate a location of a pothole about 10 miles away from a vehicular alert system vehicle 100. In such instance, the vehicular alert system vehicle 100 would not be in the position to alert drivers of the pothole.

Figure 2:
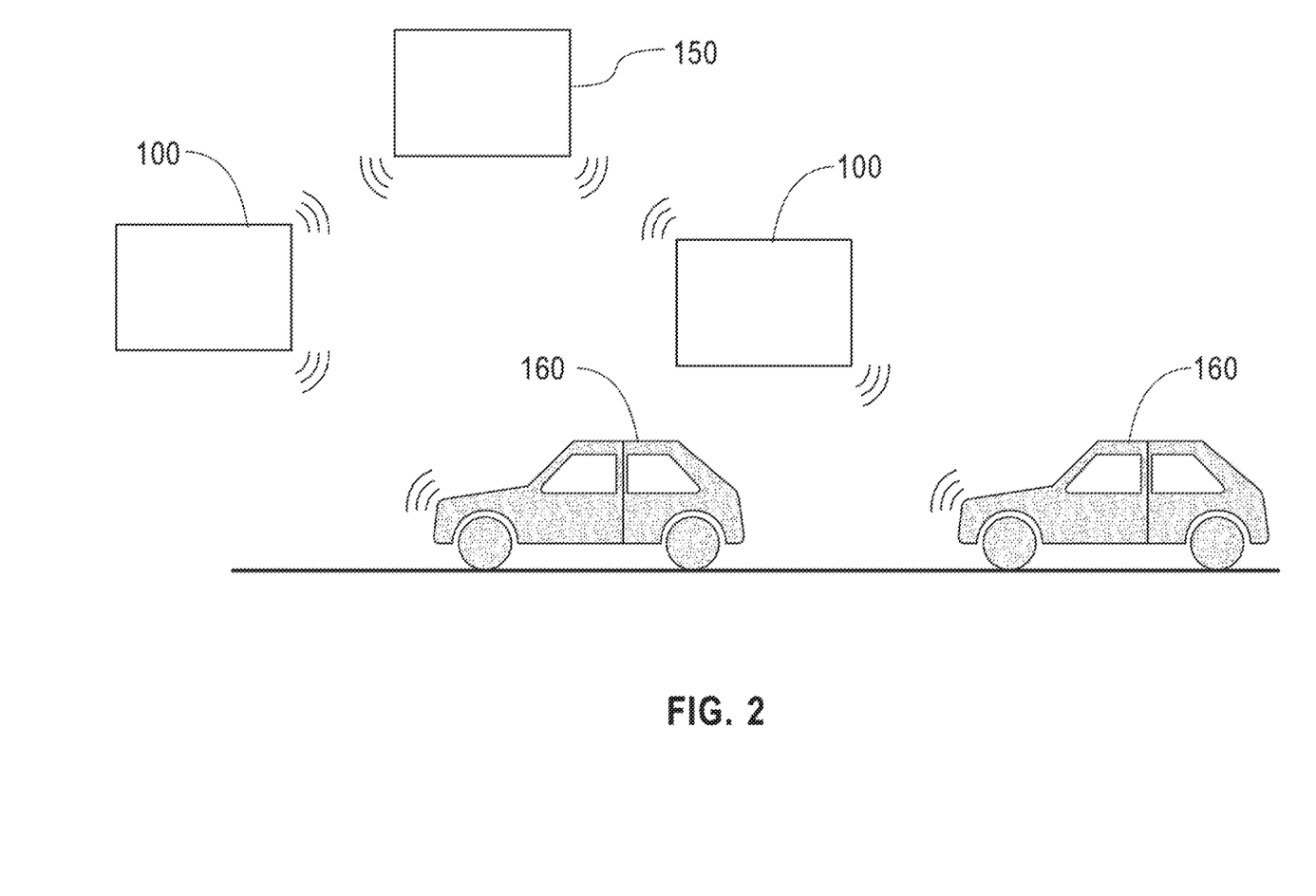
FIG. 2 illustrates a vehicular alert system including a plurality of vehicular alert system vehicles according to an embodiment of the present invention.

FIG. 2 illustrates a vehicular alert system including a plurality of vehicular alert system vehicles 100 according to an exemplary embodiment of the present invention.

Referring to FIG. 2, a plurality of vehicular alert system vehicles 100 may be deployed, e.g., to dynamically alert drivers of road hazards or conditions, which may alter the safe driving speed displayed on the display of the vehicular alert system vehicles 100. The plurality vehicular alert system vehicles 100 may also monitor the speed of multiple drivers. For example, when a hazard is detected, a vehicular alert system vehicle 100 may be dispatched to alert drivers at a predetermined distance (e.g., 500 feet) before the hazard. For example, the vehicular alert system vehicle 100 may display "black ice 500 ft ahead, speed limit 35 mph your speed: 55 mph"; however exemplary embodiments of the present invention are not limited thereto. When the condition has cleared, e.g., the temperature rises and the ice melts or a de-icing truck sprays the affected area, the vehicular alert system vehicle 100 may re-deploy itself to another location or return to a docking bay, e.g., a landing pad, a landing truck, etc. If there are more road hazards than vehicular alert system vehicles 100 available, a prioritization algorithm may determine the expected utility of dispatching a vehicular alert system vehicle 100 to a location. A look up table may be used to assess potential road hazards. The look up table may also be used to prioritize hazards for notification. For example, an accident closing all lanes of a highway may have a highest priority, an accident closing one lane of a highway may have a lower priority, and traffic moving at the speed limit may have a lowest priority. For example, signaling major road debris may be prioritized over monitoring for speeding vehicles. These scenarios may be ranked in a list, for example, numerically from 0-100. Thus, when a hazard is detected, a prioritization of notifying drivers may be determined by the list. A vehicular alert system vehicle 100 may be dispatched based on a physical proximity to the hazard and the previous function it was performing. Therefore, the closest vehicular alert system vehicle 100 will be forwarded to the hazard and/or warn drivers of this hazard.

The plurality of vehicular alert system vehicles 100 may be deployed within a predetermined area or an estimated region of need. The estimated region of need may be based on current traffic, weather, weather forecast, road conditions, history of accidents, history of a driver, proximity to regions of concern, e.g., hazards, schools, accidents, etc.; however, exemplary embodiments of the present invention are not limited thereto. A rank-ordered estimate of the benefit of the presence of the vehicular alert system vehicles 100 may be performed. For example, a plurality of vehicular alert system vehicles 100 may be dispatched along a segment of a roadway where a hazard has been reported, e.g., an accident. The highest priority may be assigned to a vehicular alert system vehicle 100 positioned about 1 mile ahead of the hazard to warn oncoming drivers. A lower priority may be assigned to a vehicular alert system vehicle 100 positioned about a half mile ahead of the hazard. The vehicular alert system vehicle 100 may alert drivers, for example, to slow down or to shift to a lane not blocked by the hazard. The vehicular alert system vehicles 100 may survey an area, identify hazards, and make decisions about alerting drivers using local autonomous aerial vehicle-based logic. For example, a look up table may be used to assess potential road hazards. The look up table may also be used to prioritize hazards for notification. For example, vehicular alert system vehicles 100 may observe an accident blocking all lanes of a highway, a broken car blocking a single lane of a highway, or a motorist traveling at a relatively low speed. Each hazard may produce a need to alert drivers; however, the alerts provided to drivers may depend on the current situation. Thus, the local autonomous aerial vehicle-based logic for alerting the drivers may depend on the severity of the hazard. For example, an accident blocking all lanes of the highway may have a higher priority to alert drivers compared to a motorist traveling at a relatively low speed.

The plurality of vehicular alert system vehicles 100 may also perform an aerial survey. The aerial survey may be performed to determine hazards. The vehicular alert system vehicles 100 may perform the aerial survey using automated flight planning and real time computer vision. Accordingly, the vehicular alert system vehicles 100 may make local decisions as to how and where to alert drivers. For example, a vehicular system alert vehicle 100 may locate a pothole. The vehicular system alert vehicle 100 may position itself in front of or over the pothole to alert oncoming drivers. The vehicular system alert vehicle 100 may also suggest a safer speed in comparison to the current speed of oncoming vehicles. As another example, the vehicular system alert vehicle 100 may detect traffic moving faster than can safely travel on a road. The vehicular system alert vehicle 100 may deploy itself with a speed warning message to these motorists.

The plurality of vehicular alert system vehicles 100 may detect a hazardous condition determined to match present hazardous parameters. The preset hazardous parameters may include a traffic jam, black ice, animal debris, and potholes. When the vehicular alert system vehicle 100 detects a condition determined to match a preset hazardous parameter, the vehicular alert system vehicle 100 may display a hazard signal and a reduce speed signal on the display 115.

Each of the plurality of vehicular alert system vehicles 100 may include the processor 105, the data transceiver 110, the display 115, and the detector 120. The processor 105 may control the data transceiver 110. The detector 120 may detect local information, one or more vehicular condition, e.g., vehicle speed, and one or more preset hazardous parameters. The preset hazardous parameters may include one or more of a traffic jam, black ice, animal debris, and pothole condition determined from detection and/or data analytics as described above. The central computer 180 may communicate with each vehicular alert system vehicle 100 via the data transceiver 110. The memory device 155 may store road location and speed limit data, which may be preloaded or downloaded from a source via a wired or wireless network. The memory device 155 may also store detected data including vehicular condition data and road condition data transmitted by each vehicular alert system vehicle 100. When the central computer 180 determines an existence of a hazardous condition, one or more of the plurality of vehicular alert system vehicles 100 may be dispatched to the location determined to be hazardous.

According to an exemplary embodiment of the present invention, the vehicular system alert vehicle 100 may fly over traffic at the legal speed limit. The vehicular system alert vehicle 100 may also detect vehicles going the wrong way on roadways. Accordingly, the vehicular alert system vehicle 100 may alert drivers of potential wrong way drivers in an effort to avoid a head-on collision.

The vehicular alert system vehicle 100 may be configured to provide traffic management reports. The traffic management reports may be created by the vehicular alert system vehicle 100 at different locations within a predetermined region. Each vehicular alert system vehicle 100 may capture data from vehicles that pass the device. The captured vehicle data may be communicated to a central computer database. At the central computer database, a user interface may select one or more criteria from a plurality of criteria for filing the captured vehicle data. The traffic management reports may be automatically formed from the filtered vehicle data using the selected criteria.

The plurality of vehicular alert system vehicles 100 may be used by cities and towns, neighborhoods, school zones, work zones, parks, daycare areas, churches, or anywhere to alert drivers of hazardous conditions or when they exceed a safe speed, given current ambient conditions.

Figure 3:
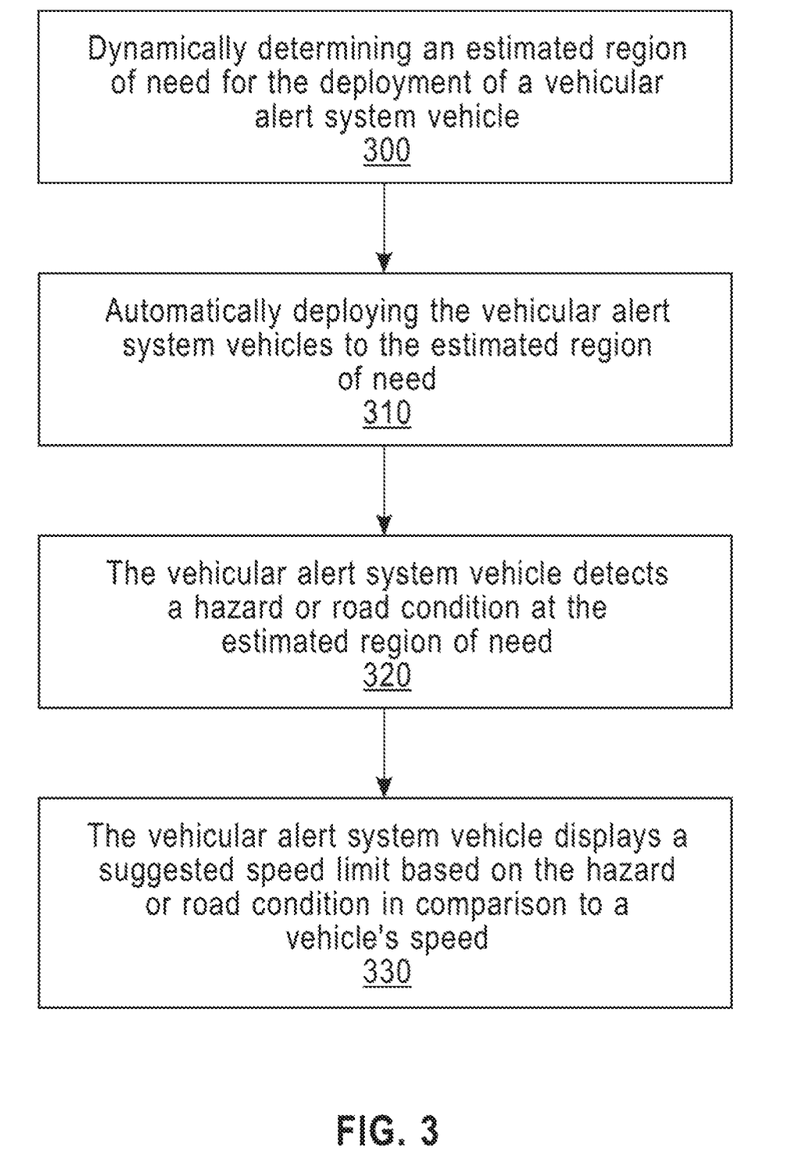
FIG. 3 is a flowchart illustrating a vehicular alert method according to an embodiment of the present invention.

FIG. 3 is a flowchart illustrating a vehicular alert method according to an exemplary embodiment of the present invention.

Referring to FIG. 3, a vehicular alert method may include dynamically determining an estimated region of need for the deployment of a vehicular alert system vehicle 300. The estimated region of need may be based on current traffic, weather, weather forecast, road conditions, history of accidents, history of a driver, and proximity to regions of concern, such as hazards, school zones, and accidents; however, exemplary embodiments of the present invention are not limited thereto. After the determination, the vehicular alert system vehicle may be automatically deployed to the estimated region of need 310. The vehicular alert system vehicle may detect a hazard or road condition at the estimated region of need 320. The vehicular alert system vehicle may display a suggested speed limit based on the hazard or road condition in comparison to the vehicle's speed 330. The hazard or road condition may be based on traffic, accidents or weather conditions. For example, the vehicular alert system vehicle 100 may detect a presence of black ice, e.g., by using a black ice detector. The vehicular alert system vehicle 100 may also detect or estimate a likeliness of vehicle skidding due to, e.g., a presence of snow on a segment of road that has a relatively high curvature. Road curvature may be determined, for example, by map data or image analytics. The vehicular alert system vehicle 100 may also detect an object on the road. These potential hazards may be estimated by imaging methods, for example detecting snow on a road, with information from weather reports or from real-time skidding data from vehicles on the road. For example, if anti-lock brakes are deployed on a segment of road and the information is communicated to a vehicular alert system vehicle 100, a hazard may be indicated. Due to such hazards and road conditions, a vehicular alert system vehicle 100 may suggest a speed which is less than the speed limit. For example, the speed limit for a road may be 40 mph. If the vehicular alert system vehicle 100 has determined, by one or more means, that a hazard exists, the speed limit may be reduced by a predetermined amount, for example, by 10 mph to 30 mph. If a vehicle 160 is traveling at a speed of 50 mph, the vehicular alert system vehicle 100 may alert the vehicle 160, for example, to reduce its speed. If a vehicle 160 is traveling at 30 mph, the vehicular alert system vehicle 100 might not alert the vehicle 160. The vehicular alert system vehicle 100 may alert the vehicle 160 traveling faster than the reduced speed limit, by displaying the driver's current speed (e.g., 50 mph) and the requested speed (e.g., 30 mph). The predetermined amount to reduce the speed limit by may depend on, for example, the nature of the current hazard, a history of accidents in this region of the road, or the type of vehicle being driven. The type of vehicle being driven may be determined or estimated by image processing methods (e.g., in order to distinguish a car from a truck, a motorcycle, or a sport-utility vehicle (SUV)).

Figure 4:
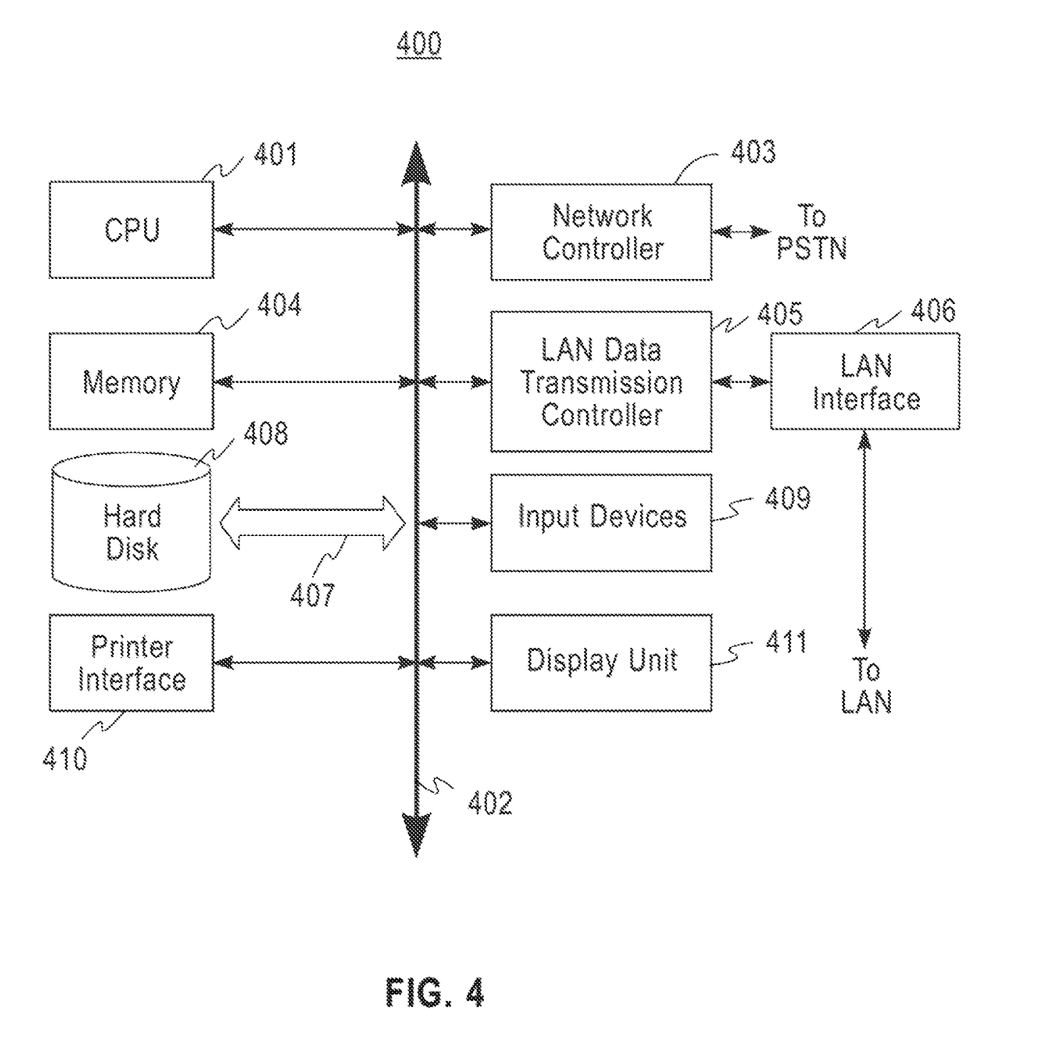
FIG. 4 illustrates an example of a computer system capable of implementing the methods according to embodiments of the present invention.

FIG. 4 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 400 may include, for example, a central processing unit (CPU) 401, random access memory (RAM) 404, a printer interface 410, a display unit 411, a local area network (LAN) data transmission controller 405, a LAN interface 406, a network controller 403, an internal bus 402, and one or more input devices 409, for example, a keyboard, mouse etc. As shown, the system 400 may be connected to a data storage device, for example, a hard disk, 408 via a link 407.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and/or block diagrams in the figures illustrate the architecture, functionality, and operation of possible implementations of systems, methods, and computer program products according to various exemplary embodiments of the invention. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A vehicular alert system, comprising:
an autonomous aerial vehicle that includes a processor that controls a data transceiver, a display, and a detector that detects a vehicular condition or a road condition,
wherein the data transceiver of the autonomous aerial vehicle transmits the vehicular condition or the road condition directly to at least one vehicle;
and a central computer that communicates with the autonomous aerial vehicle via the data transceiver, the central computer having a memory device that stores the vehicular condition or the road condition,
wherein the central computer communicates one of a vehicular condition or a road condition to the autonomous aerial vehicle, and the processor of the autonomous aerial vehicle displays the received condition on the display,
wherein the autonomous aerial vehicle displays a reduced speed to an approaching vehicle that is reduced with respect to a legal speed limit,
wherein the reduced speed is reduced by a predetermined amount based upon a type of vehicle being driven, a history of accidents nearby, current weather, a future weather forecast and a type of a real-time hazard detected ahead of the approaching vehicle by the autonomous aerial vehicle and compared to preset hazardous parameters stored in a look up table, and
wherein the preset hazardous parameters stored in the lookup table include black ice, slippery roads, a traffic accident, road debris, animal debris, and potholes.

2. The system of claim 1, wherein the autonomous aerial vehicle includes a speed detector that detects vehicular speed.

3. The system of claim 1, wherein road condition data includes one of current traffic, weather, weather forecast, road conditions, history of accidents, history of a driver, and nearness to hazards.

4. The system of claim 1, wherein upon the autonomous aerial vehicle detecting a hazardous condition, the autonomous aerial vehicle is configured to report the condition to the central computer, display a warning message on the display, and hover at the site of the hazardous condition.

5. The system of claim 1, wherein the central computer performs data analytics on aggregate crowd-sourced road condition data received from a plurality of vehicles in order to determine locations of real-time hazards contained within the aggregate of crowd-sourced road condition data, and wherein the autonomous aerial vehicle is deployed by the central computer to a located real-time hazard prioritized according to recency and severity.

6. The system of claim 1, wherein the autonomous aerial vehicle determines an optimal speed at which a vehicle should move to arrive at the closest traffic light based on at least one of vehicular or road condition data, and the autonomous aerial vehicle outputs the optimal speed via the display.

7. The system of claim 1, wherein the autonomous aerial vehicle identifies and marks a speeding vehicle, and wherein the autonomous aerial vehicle marks the speeding vehicle by attaching itself with a suction cup or by using a washable ink.

8. The system of claim 1, wherein the autonomous aerial vehicle posts a hazardous condition on the display and travels ahead of and positions the display to be viewable by a driver of a vehicle traveling at speed.

9. The system of claim 1, wherein multiple autonomous aerial vehicles are deployed to an estimated region of need to scour for undetected hazards and alert nearby vehicles when a previously undetected hazard is detected based on a rank-ordered estimate of the benefit of the presence of one or more autonomous aerial vehicles, and wherein the rank-ordered estimate of benefit is based upon at least one of current weather, weather forecast, history of accidents, history of a driver, proximity to schools, work zones, parks, daycares and religious institutions.

10. The system of claim 1, wherein autonomous aerial vehicles survey an area, identify hazards, and make decisions about alerting drivers using local autonomous aerial vehicle-based logic, and wherein the identified hazards include an estimated likelihood of vehicle skidding given an image-analyzed road curvature.

11. The system of claim 1, wherein the detector includes a black ice detecting unit to detect black ice.

12. The system of claim 1, wherein the location of at least one of road hazards including traffic jam, animal debris, potholes, and black ice is sent to authorities.

13. The vehicular alert system of claim 1, wherein the detector further includes a microwave generator configured to provide a microwave carrier signal to a road surface, wherein the microwave carrier signal is emitted by a microwave horn-type sensor that includes a microwave diode configured to receive a reflected microwave signal from the road surface.

* * * * *